(12) United States Patent
Kondo et al.

(10) Patent No.: US 7,943,075 B2
(45) Date of Patent: May 17, 2011

(54) METHOD FOR PRODUCING FIBER-REINFORCED COMPOSITE

(75) Inventors: Junichi Kondo, Saitama-ken (JP); Yuki Kasahara, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 221 days.

(21) Appl. No.: 11/808,410

(22) Filed: Jun. 8, 2007

(65) Prior Publication Data
US 2007/0286955 A1 Dec. 13, 2007

(30) Foreign Application Priority Data
Jun. 9, 2006 (JP) ................. 2006-161050

(51) Int. Cl.
B29C 70/44 (2006.01)
B29C 45/14 (2006.01)
B29C 65/00 (2006.01)
B32B 37/00 (2006.01)
B27N 3/10 (2006.01)
B28B 1/48 (2006.01)
B29D 19/08 (2006.01)
C08J 5/00 (2006.01)
D04H 3/08 (2006.01)

(52) U.S. Cl. ........ 264/258; 264/257; 264/154; 264/155; 264/156; 156/307.1; 156/181; 156/182

(58) Field of Classification Search .......... 264/257, 264/258, 154, 155, 156; 156/307.1, 181, 156/182
See application file for complete search history.

(56) References Cited

U.S. PATENT DOCUMENTS

| | | | | |
|---|---|---|---|---|
| 3,631,753 A * | 1/1972 | Hall et al. | ................. | 83/399 |
| 4,734,146 A * | 3/1988 | Halcomb et al. | .......... | 156/148 |
| 4,966,802 A * | 10/1990 | Hertzberg | ............... | 428/119 |
| 5,359,817 A * | 11/1994 | Fulton | ................. | 52/288.1 |
| 5,433,915 A * | 7/1995 | Yamamoto et al. | ....... | 264/510 |
| 5,639,535 A * | 6/1997 | McCarville | ............. | 428/119 |
| 5,756,034 A * | 5/1998 | Newton et al. | ........... | 264/258 |
| 5,817,269 A * | 10/1998 | Younie et al. | ............ | 264/258 |
| 6,146,122 A * | 11/2000 | Kato | ...................... | 425/125 |
| 6,523,246 B1* | 2/2003 | Matsui et al. | .............. | 29/559 |
| 6,620,369 B1* | 9/2003 | Mead | ..................... | 264/409 |
| 6,858,171 B1* | 2/2005 | Wu | ......................... | 264/219 |

* cited by examiner

*Primary Examiner* — Khanh Nguyen
*Assistant Examiner* — Matthew Hoover
(74) *Attorney, Agent, or Firm* — Birch, Stewart, Kolasch & Birch, LLP

(57) ABSTRACT

A method for producing a fiber-reinforced composite member from prepregs of reinforcing fibers impregnated with a matrix resin, comprising placing the prepregs in a cavity of a molding die, cutting off excess margins of the prepregs along the edges of the cavity, and curing the matrix resin.

8 Claims, 18 Drawing Sheets

Fig. 2B-1
Fig. 2B-2
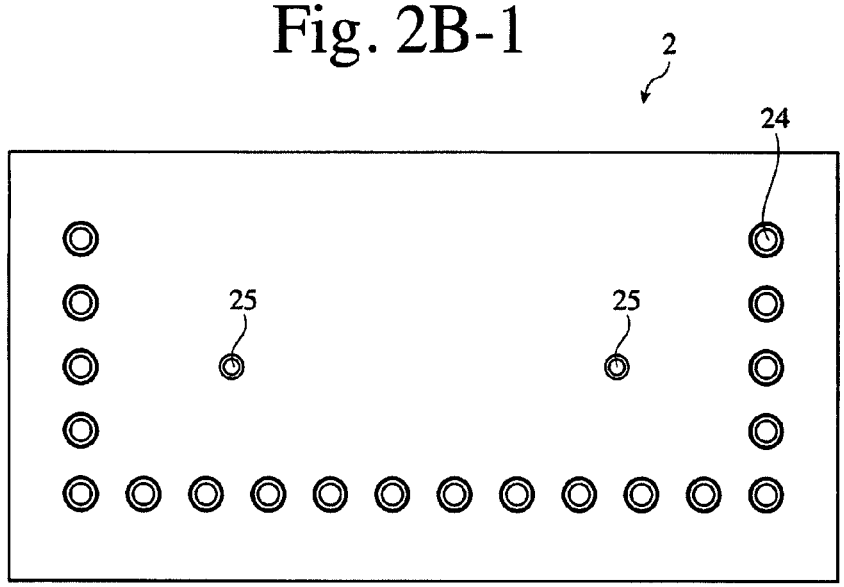
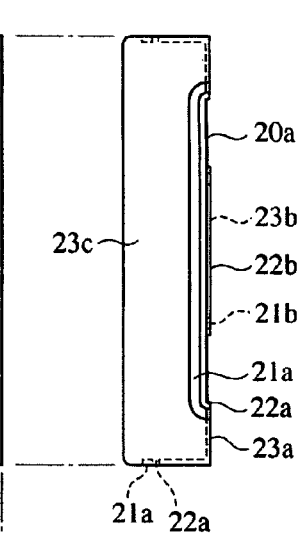
Fig. 2B-3
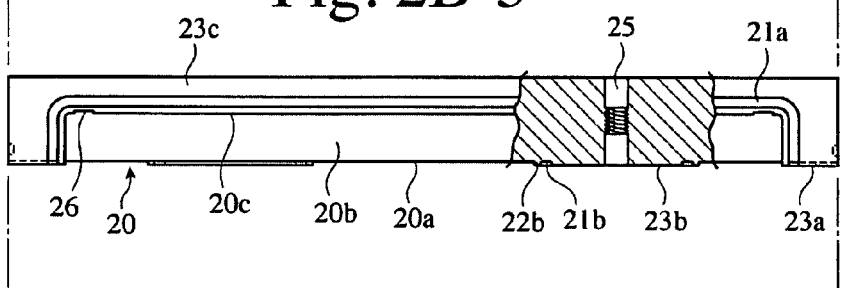
Fig. 2B-4
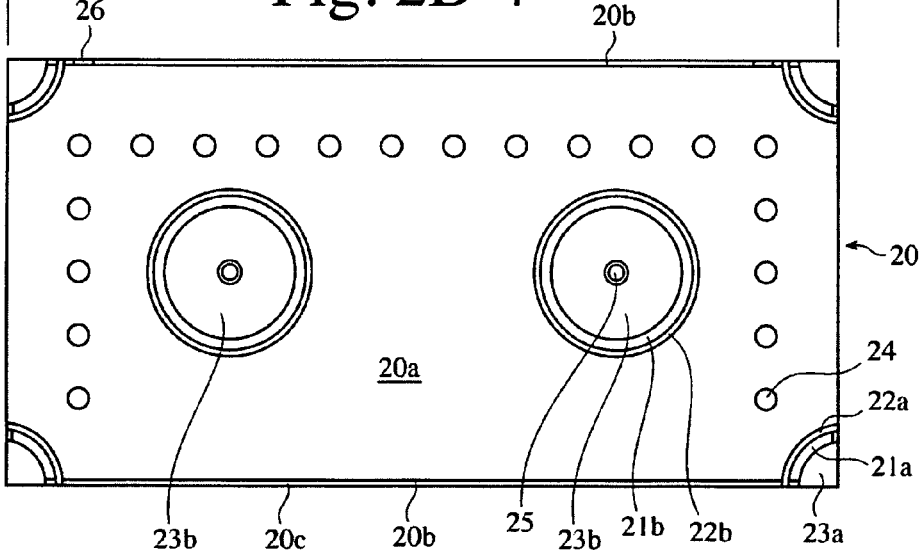

Fig. 2C-1
Fig. 2C-2
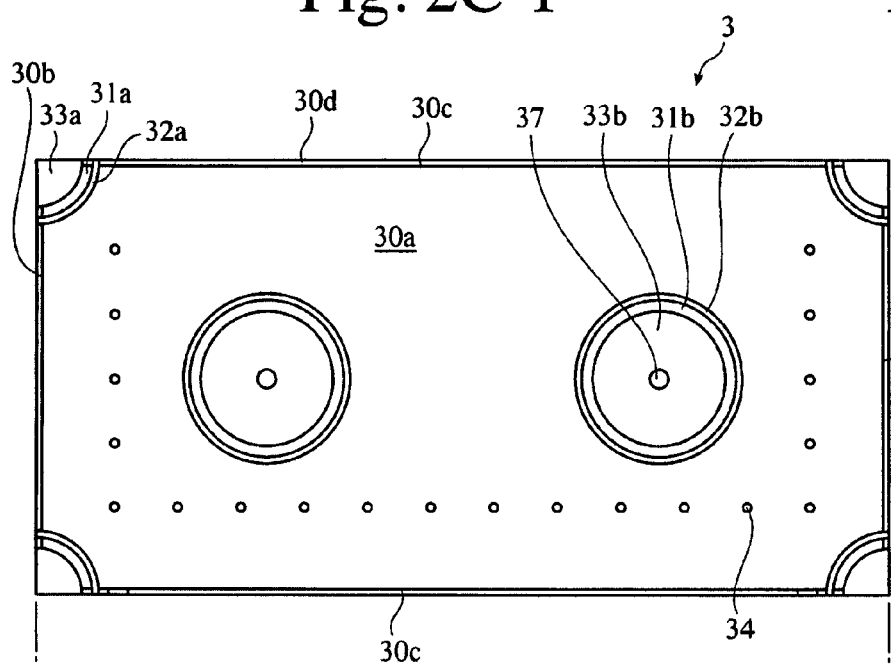
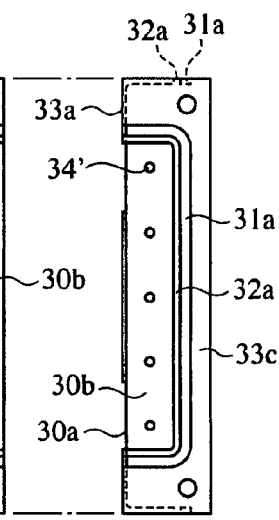
Fig. 2C-3
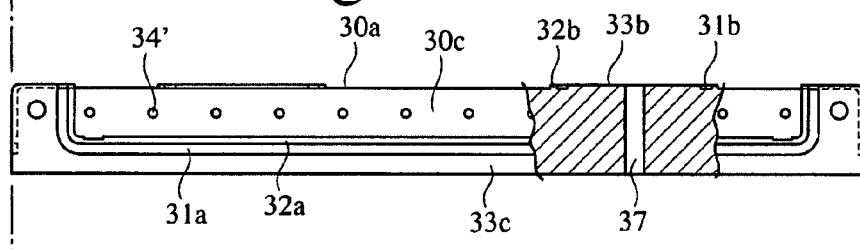
Fig. 2C-4
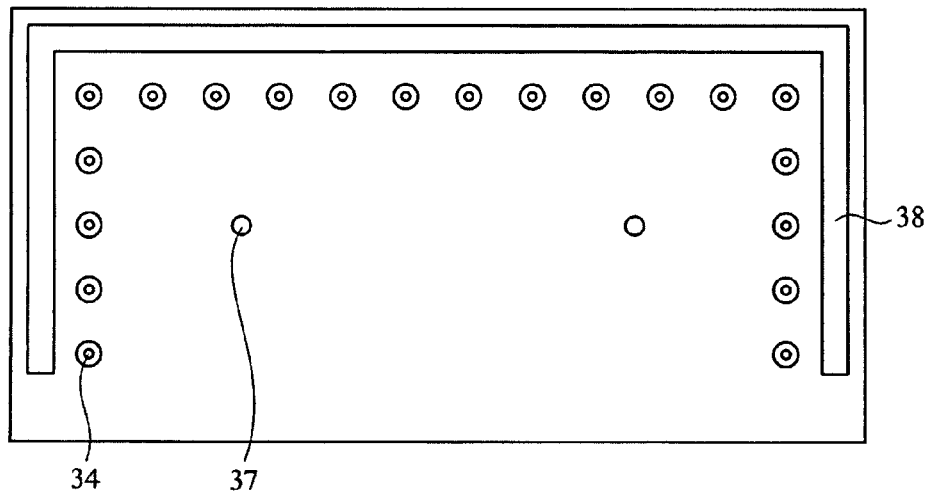

METHOD FOR PRODUCING FIBER-REINFORCED COMPOSITE

FIELD OF THE INVENTION

The present invention relates to a method for producing a fiber-reinforced composite member accurately and easily at lower cost.

BACKGROUND OF THE INVENTION

Cured prepreg moldings (fiber-reinforced composites) composed of carbon-fiber-reinforced plastics (CFRP), etc. are conventionally produced by curing prepregs with excess margins, and cutting off the excess margins from the resultant cured molding by a cutting tool such as an endmill, a rooter, etc., to secure high dimensional accuracy. However, the fiber-reinforced composites are hard to cut because of high strength and rigidity, resulting in rapid wear of cutting tools and thus short life of cutting tools. Also, fibers extend from the cut surface like fluff, and interlaminar peeling occurs on the cut surface by vibration during cutting, resulting in decrease in strength and fatigue failure. An endmill having fine diamond particles electrodeposited on cutting edges was proposed as that with improved wear resistance, but this endmill fails to have elongated life because of clogging of dust.

As a method of cutting a fiber-reinforced composite member without generating fluff and burr on a cut surface, JP 59-27827 B proposes a method of cutting a fiber-reinforced composite member fixed by a jig with a blade-overlapping portion of a rooter having blades with different helix angles.

As an endmill causing no clogging of dust during the cutting of a fiber-reinforced composite member, JU 2-82461 A proposes an endmill having grinder particles electrodeposited on a grinding surface, and provided with dust-discharging grooves on grinding peripheral surface.

As a method of cutting a fiber-reinforced plastic laminate while preventing interlaminar peeling and the tearing of fibers, JP 5-318218 A proposes a method of cutting an end surface of a fiber-reinforced plastic laminate by a cutter after heat curing, the fiber-reinforced plastic laminate comprising a carbon-fiber prepreg laminate and glass-fiber cloths provided on both surfaces, carbon fibers in surface layers of the carbon-fiber prepreg laminate being aligned in the same direction, and the cutter having a rake face inclining at an angle of 90-180° relative to the direction of the above carbon fibers.

To provide a fiber-reinforced composite member with a good cut surface, JP 2002-283101 A proposes a method of cutting an end surface of a rotating fiber-reinforced composite member by a tool, comprising vibrating the tool in a cutting direction, the movement of the tool relative to the fiber-reinforced composite member per one period of vibration being 2 times or less the diameter of reinforcing fibers.

However, the methods of JP 59-27827 B, JU 2-82461 A and JP 2002-283101 A need special tools, resulting in high cost. Also, the method of JP 5-318218 A is limited to a fiber-reinforced plastic laminate with a particular lamination structure, resulting in limited freedom of design.

OBJECT OF THE INVENTION

Accordingly, an object of the present invention is to provide a method for producing a fiber-reinforced composite having good cut cross section easily and at a low cost.

DISCLOSURE OF THE INVENTION

As a result of intense research in view of the above object, the inventors have found that fiber-reinforced composite members with good cut surfaces can be produced accurately and easily at low cost by cutting off excess margins from prepregs disposed in the cavity of a molding die along the edges of the cavity, and then curing the matrix resin. The present invention has been completed based on such finding.

Thus, the method of the present invention for producing a fiber-reinforced composite member from prepregs of reinforcing fibers impregnated with a matrix resin comprises placing the prepregs in a cavity of a molding die, cutting off excess margins of the prepregs along the edges of the cavity, and curing the matrix resin.

In this method, (1) the dimension of the fiber-reinforced composite member at a curing temperature of the prepregs is calculated from the designed dimension of the fiber-reinforced composite member at room temperature, using the linear thermal expansion coefficient of the fiber-reinforced composite member, and (2) the dimension of the cavity of the molding die at room temperature is calculated using the linear thermal expansion coefficient of the molding die, such that it becomes equal to the dimension of the fiber-reinforced composite member at the curing temperature.

It is preferable that the fiber-reinforced composite member has a rectangular, flat panel portion and at least one flange extending from its edge, and that the cavity of the molding die has a horizontal portion for supporting the rectangular, flat panel portion and at least one vertical portion for supporting the flange.

It is preferable that the molding die comprises upper and lower dies, at least one of which has a cavity, that the flat panel portions of the upper and lower dies have aligned holes, and that a boring tool is inserted into the holes to form connecting holes in the rectangular, flat panel portion of the cured prepreg molding held in the cavity.

It is preferable that the vertical portion of the upper die and/or lower die has holes, and that a boring tool is inserted into the holes to form connecting holes in the flange of the cured prepreg molding held in the cavity.

A flat-tip tool is preferably inserted into at least one groove provided on an end surface of the cavity to pry the fiber-reinforced composite member out of the cavity surface.

The method of the present invention for producing a fiber-reinforced composite member having a rectangular, flat panel portion and flanges extending from its edges, from prepregs of reinforcing fibers impregnated with a matrix resin, by using a molding die comprising upper and lower dies each having a cavity, and side dies, each cavity of the upper and lower dies having a horizontal portion having aligned first holes, and vertical portions, at least one of which has second holes, comprises (1) placing a laminate of the prepregs in each cavity of the upper and lower dies; (2) cutting off excess margins of the prepreg laminate along the edges of each cavity; (3) heating the prepreg laminate after closing the upper die, the lower die and the side dies, to cure the matrix resin; (4) forming connecting holes in the rectangular, flat panel portion of the resultant cured prepreg molding by a boring tool inserted into the first holes, while the cured prepreg molding is held in the cavity; and (5) fixing a jig having holes aligned with the second holes in the vertical portion to at least one side surface of the upper or lower die, to form connecting holes in at least one flange of the cured prepreg molding by a boring tool inserted into the holes.

BRIEF DESCRIPTION OF THE DRAWINGS

FIG. 2B-1 is a plan view showing an upper die in FIG. 2A.

FIG. 2B-2 is a transverse side view showing an upper die in FIG. 2A.

FIG. 2B-3 is a longitudinal side view showing an upper die in FIG. 2A.

FIG. 2B-4 is a bottom view showing an upper die in FIG. 2A.

FIG. 2C-1 is a plan view showing a lower die in FIG. 2A.

FIG. 2C-2 is a transverse side view showing a lower die in FIG. 2A.

FIG. 2C-3 is a longitudinal side view showing a lower die in FIG. 2A.

FIG. 2C-4 is a bottom view showing a lower die in FIG. 2A.

FIG. 5E-1 is a plan view showing a prepreg laminate free from excess margins in the lower die cavity.

FIG. 5E-2 is a side view showing a prepreg laminate free from excess margins in the lower die cavity.

FIG. 5J is an enlarged cross-sectional view showing a portion D in FIG. 5H.

DESCRIPTION OF THE PREFERRED EMBODIMENTS

[1] Production Method of Fiber-Reinforced Composite

Figure 1:
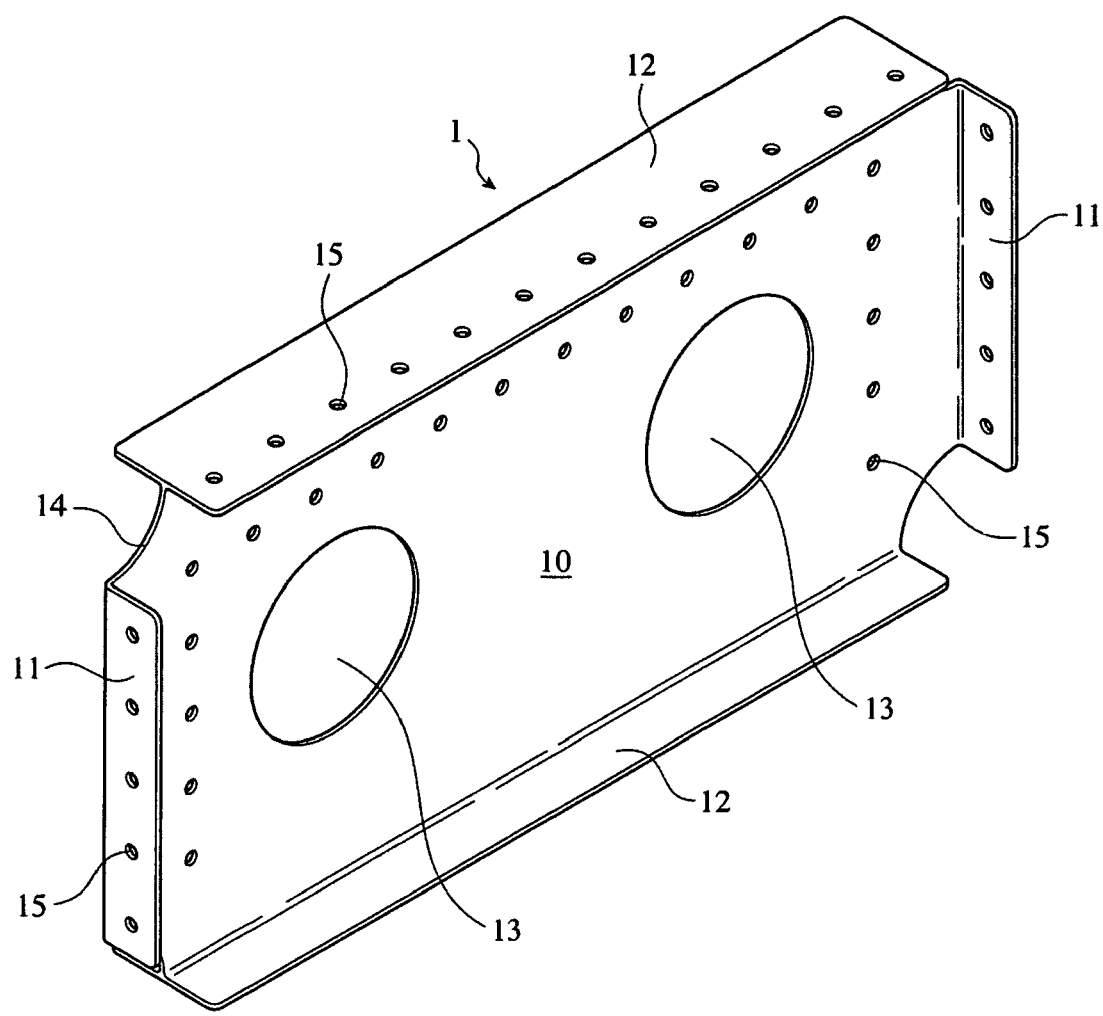
FIG. 1 is a schematic view showing one example of fiber-reinforced composites produced by the method of the present invention.
Figure 2A:
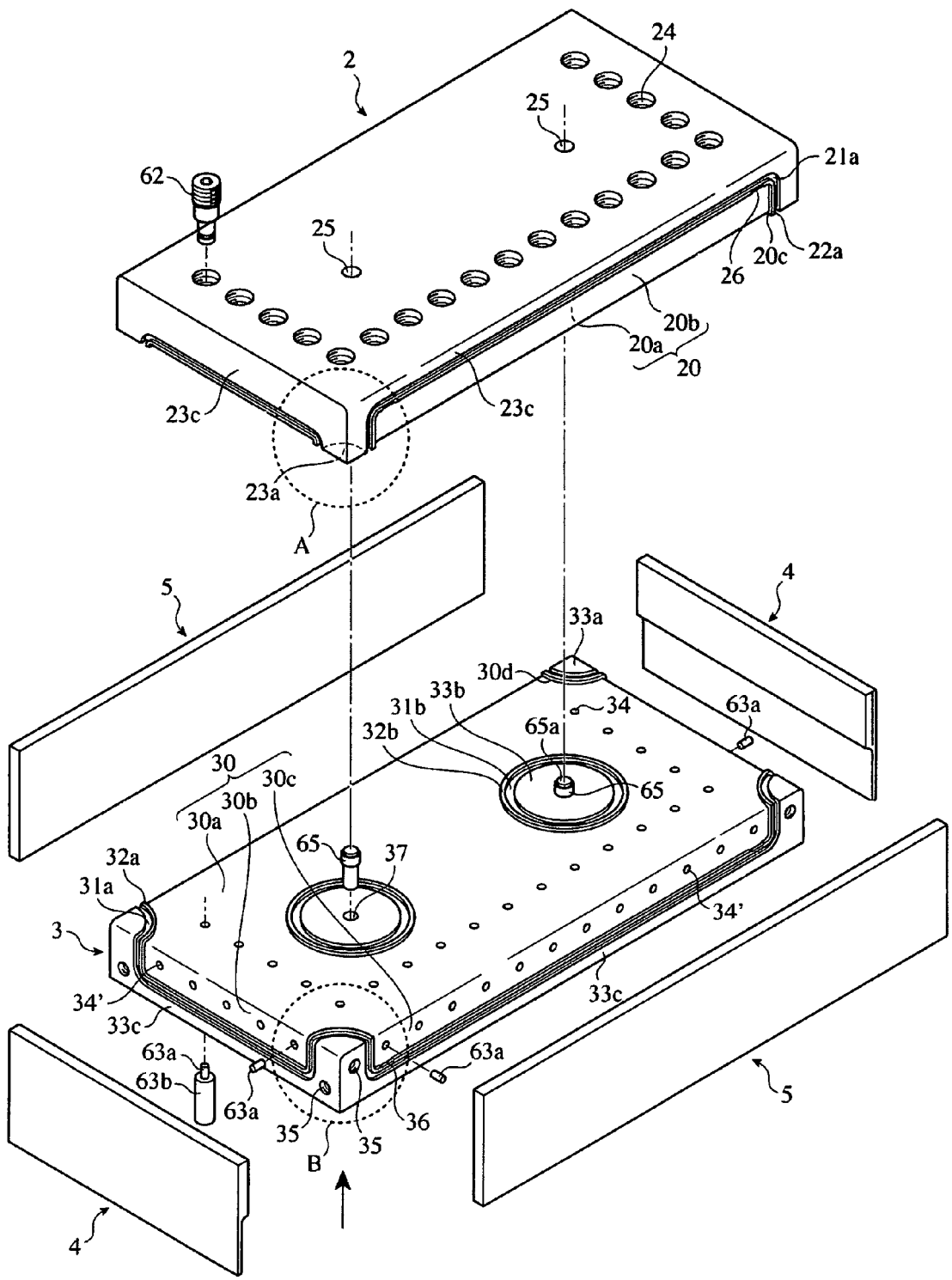
FIG. 2A is an exploded schematic view showing one example of molds for forming the fiber-reinforced composite of FIG. 1.

FIG. 1 shows one example of fiber-reinforced composites produced by the method of the present invention. This fiber-reinforced composite panel 1, which is produced by curing prepregs of reinforcing fibers impregnated with a matrix resin, comprises a rectangular, flat panel portion 10, flanges 11, 11 projecting from both transverse side edges of the flat panel portion 10 on one side, flanges 12, 12' projecting from both longitudinal side edges of the flat panel portion 10 on both sides, circular holes 13, 13 provided in the flat panel portion 10 for weight reduction, and circular notches 14 provided at four corners of the flat panel portion 10. The flat panel portion 10, the flanges 11, 11 and the flange 12 of the fiber-reinforced composite panel 1 have holes 15 for connection to other members with connecting means such as rivets, etc. Taking for example the molding of the fiber-reinforced composite panel 1 shown in FIG. 1, the method of the present invention for producing a fiber-reinforced composite will be explained below.

(1) Molding Die (a) Shape

Figure 4A:
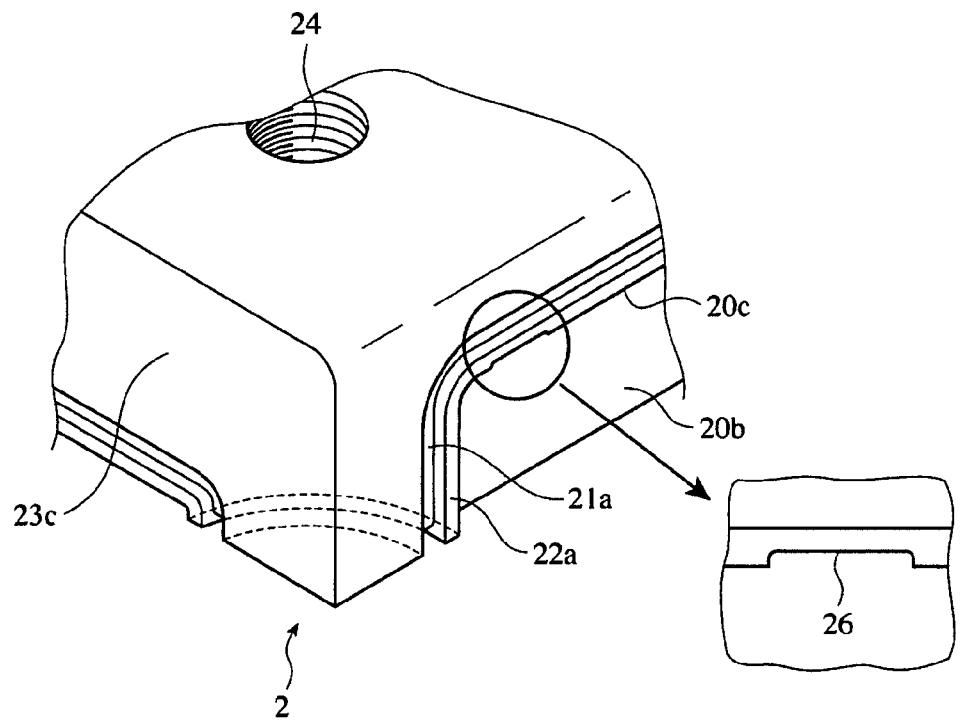
FIG. 4A is an enlarged perspective view showing a portion A in FIG. 2A.
Figure 4B:
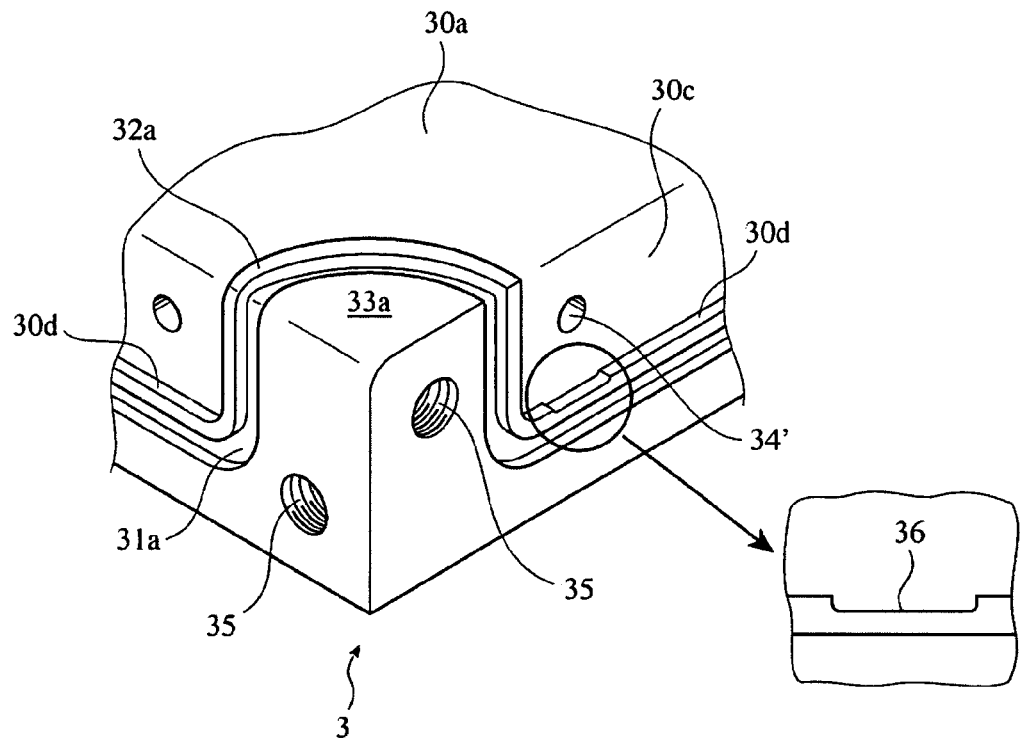
FIG. 4B is an enlarged perspective view showing a portion B in FIG. 2A.
Figure 5A:
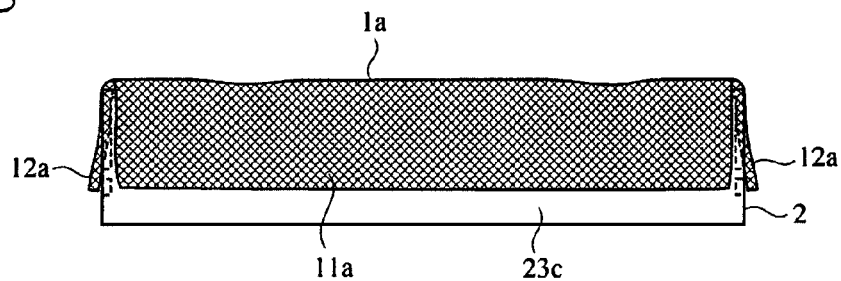
FIG. 5A is a side view showing a prepreg laminate placed on the upper die.
Figure 5B:
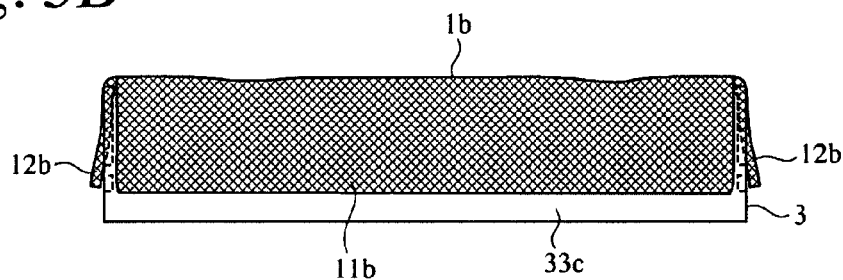
FIG. 5B is a side view showing a prepreg laminate placed on the lower die.
Figure 5C:
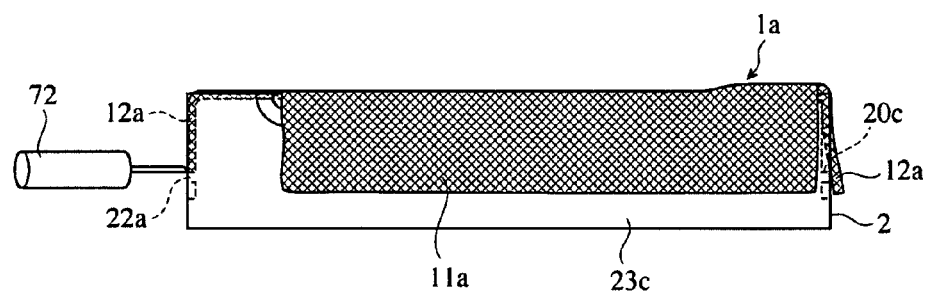
FIG. 5C is a side view showing the cutting of a transverse excess margin of the prepreg laminate placed on the upper die.
Figure 5D:
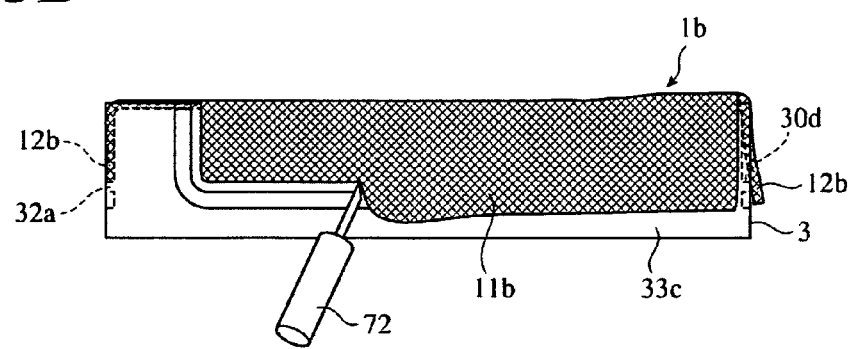
FIG. 5D is a side view showing the cutting of a transverse excess margin of the prepreg laminate placed on the lower die.
Figures 1, 5E:
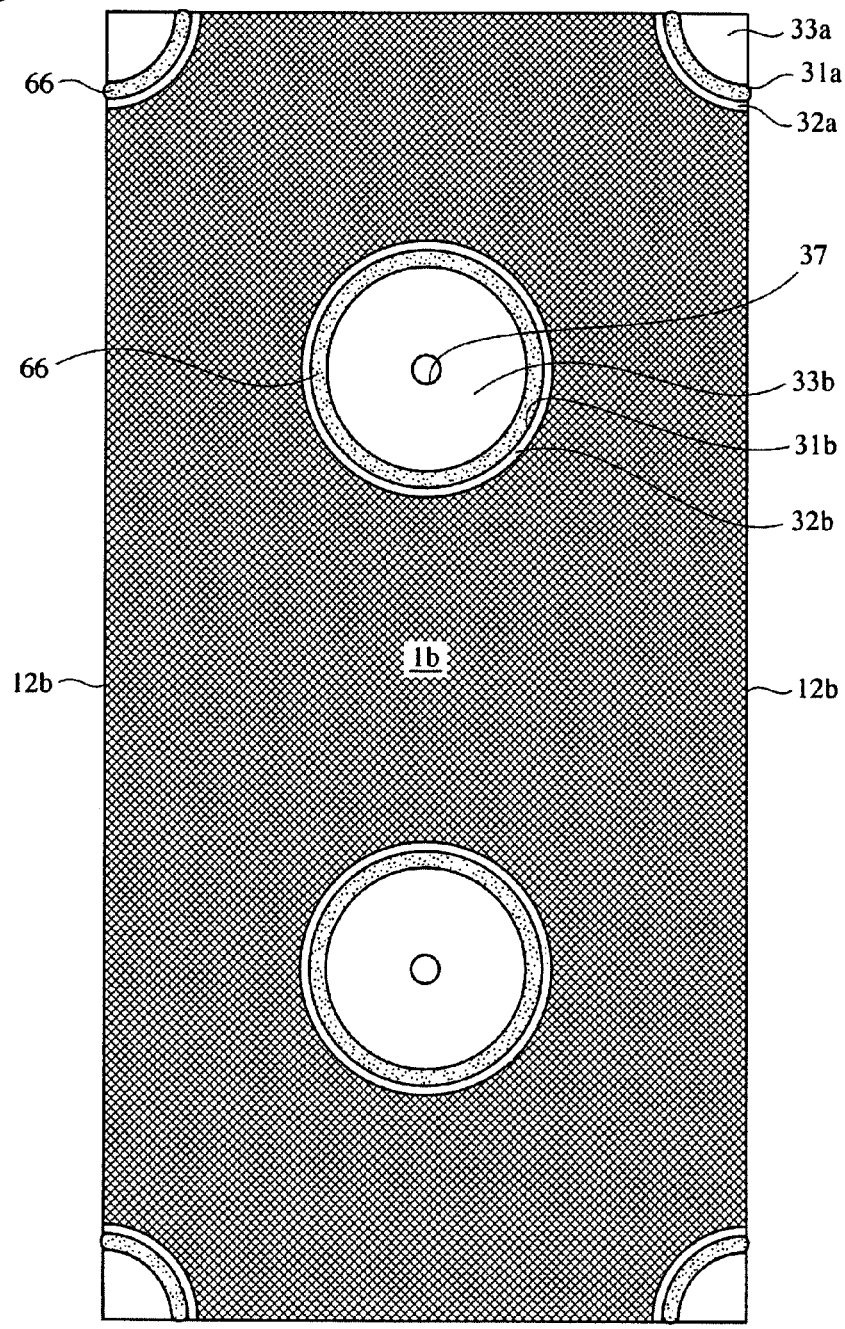
Figures 2, 5E:
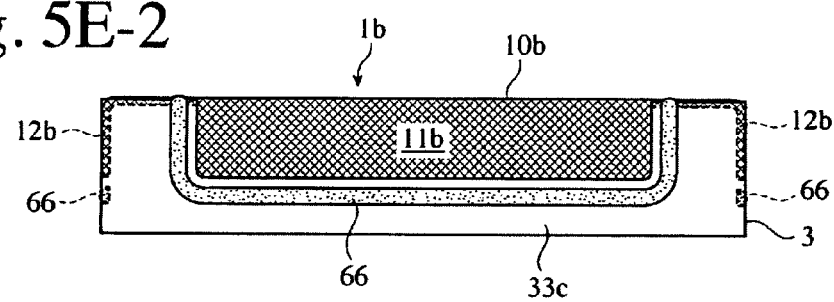

FIGS. 2-4 show one example of molds for forming the fiber-reinforced composite panel 1 shown in FIG. 1. This mold comprises upper and lower molds 2, 3 having cavities 20, 30 for forming the flat panel portion 10 and flanges 11, 11, 12, 12 of the fiber-reinforced composite 1, and side molds 4, 4, 5, 5 clamped to the upper and lower molds 2, 3.

The upper mold 2 has a cavity 20 comprising a horizontal portion 20a for forming the flat panel portion 10 of the fiber-reinforced composite panel 1, and vertical portions 20b, 20b for forming the flanges 12, 12. The upper mold 2 has fan-shaped projections 23a, 23a, 23a, 23a with their circular sides inside at four corners of the horizontal portion 20a, and flat sides of each fan-shaped projection 23a extend slightly outward from the vertical portions 20b, 20b. Because each vertical portion 20b extends to a certain vertical position of the upper mold 2, the root portions (upper portions) of the adjacent fan-shaped projections 23a are connected through a horizontal projection 23c extending along the upper surface of the upper mold 2. Because a groove 21a for receiving a resin-leak-preventing seal 66 extends along the peripheral edge of the cavity 20, a flange 22a is provided between the peripheral edge of the cavity 20 and the groove 21a.

The horizontal portion 20a has a pair of circular projections 23b, 23b in its center portions, to form circular holes 13, 13 in the fiber-reinforced composite member 1. Each circular projection 23b has a hole 25 in its center, into which a pin 65 described later is inserted. There is an annular groove 21b for receiving a resin-leak-preventing seal 66 between each circular projection 23b and an annular flange 22b of the same height provided around the circular projection 23b.

Figure 3A:
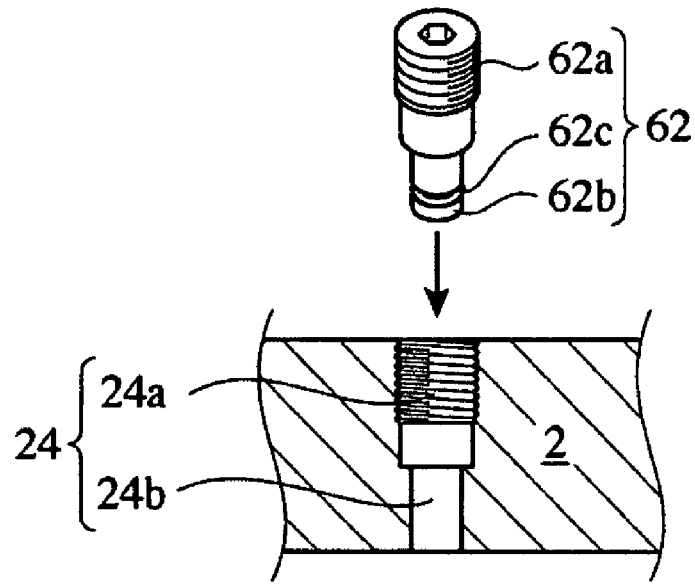
FIG. 3A is a partial cross-sectional view showing a pin mechanism provided in the upper die.

The upper die 2 has holes 24, into which a drill is inserted to form holes 15 in the fiber-reinforced composite member 1. As shown in FIG. 3A, each hole 24 has a large-diameter, threaded portion 24a, and a small-diameter portion 24b without a threaded portion from above. A resin-leak-preventing plug 62 for the upper die 2 has a complementary shape to the hole 24, with a threaded head 62a threadably engageable with the large-diameter, threaded portion 24a. A tip-end portion 62b inserted into the small-diameter hole portion 24b is provided with an O-ring 62c made of, for instance, silicone rubbers, fluororubbers, etc., to prevent resin leak. When the plug 62 is screwed into the hole 24, a tip-end surface of the small-diameter hole portion 24b is on the same plane as the horizontal portion 20a of the cavity 20.

As shown in FIG. 4A, to pry the resultant fiber-reinforced composite member 1 out of the upper die 2, the upper die 2 properly has a shallow groove 26 on an inner surface of the flange 22a (end surface 20c of the cavity 20), into which a flat-tip tool such as a minus driver, etc. is inserted.

The lower die 3 has a shape corresponding to that of the upper die 2. A cavity 30 of the lower die 3 has a horizontal portion 30a for forming the flat panel portion 10 of the fiber-reinforced composite member 1, vertical portions 30b, 30b for forming the transverse flanges 11, 11 of the fiber-reinforced composite member 1, and vertical portions 30c, 30c for forming the longitudinal flanges 12, 12 of the fiber-reinforced composite member 1. There are fan-shaped projections 33a, 33a, 33a, 33a having the same shape as that of the fan-shaped projections 23a, 23a, 23a, 23a of the upper die 2 at four corners of the horizontal portion 30a, with flat side surfaces of each fan-shaped projection 33a slightly projecting from the vertical portions 30b, 30b, 30c, 30c. Because each vertical portion 30b, 30c reaches a certain vertical position of the lower die 2, the root portions (lower portions) of the adjacent fan-shaped projections 33a are connected by a horizontal projection 33c extending along the lower surface of the lower die 3. Because a groove 31a for receiving a resin-leak-preventing seal 66 is formed around the periphery of the cavity 30, a flange 32a is formed between the peripheral edge of the cavity 30 and the groove 31a.

The horizontal portion 30a has a pair of circular projections 33b, 33b in its center portions, to form circular holes 13, 13 in the fiber-reinforced composite member 1. There is an annular groove 31b for receiving a resin-leak-preventing seal 66 between each circular projection 33b and an annular flange 32b of the same height provided around the circular projection 33b. Each circular projection 33b has a hole 37 at center, into which a pin 65 is inserted. Because the pin 65 has a head 65a having a larger diameter than that of the hole 37, the head 65a of each pin 65 inserted into the hole 37 does not enter into the hole 37 but is received in the hole 25 of the upper die 2, resulting in the positing of the lower die 3 relative to the upper die 2.

Figure 3B:
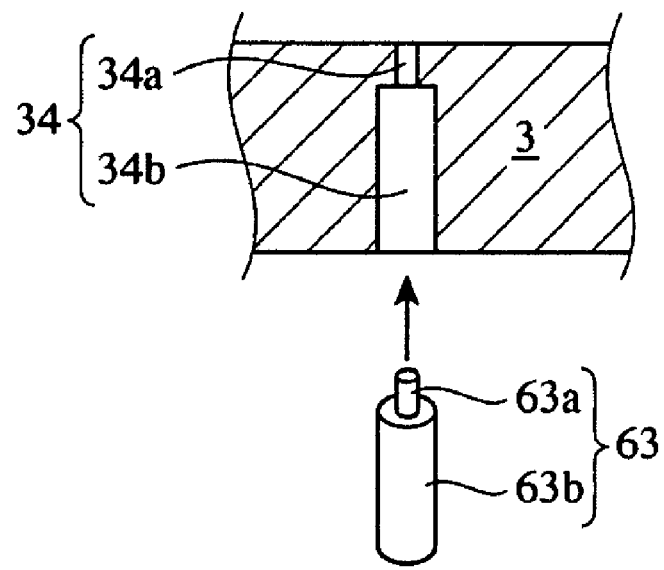
FIG. 3B is a partial cross-sectional view showing a pin mechanism provided in the lower die.

The lower die 3 has holes 34 in its horizontal portion 30a, which are vertically aligned with the holes 24 of the upper die 2. One vertical portion 30b and both vertical portions 30c, 30c have holes 34'. The holes 34, 34' having the same diameter receive a drill for forming holes 15 in the fiber-reinforced composite member 1. As shown in FIG. 3(b), each hole 34 has a small-diameter portion 34a and a large-diameter portion 34b from above. A resin-leak-preventing plug 63 for the lower die 3 comprises a small-diameter portion 63a fit into the small-diameter hole portion 34a, and a large-diameter portion 63b received in the large-diameter hole portion 34b. Though not shown, the large-diameter portion 63b may be threaded to the large-diameter hole portion 34b if necessary, to prevent the plugs 63 from detaching during molding. A tip-end surface of the plug 63 received in the hole 34 or 34' is on the same plane as the horizontal portion 30a or vertical portion 30b, 30c of the cavity 30. The lower die 3 is provided on its lower surface with a groove 38 for removing the plug 63 from the holes 34' after curing the matrix resin, along the vertical portions 30b, 30c of the cavity 30.

As shown in FIG. 4B, the lower die 3 is also provided with a shallow groove 36 on an inner surface of the flange 32a (end surface 30d of the cavity 30), into which a flat-tip tool for prying the resultant fiber-reinforced composite member 1 out of the lower die 3 is inserted.

Because the cured fiber-reinforced composite member 1 tends to become thicker by about 0.1 mm after opening the die, a cavity constituted by the cavities 20, 30 of the upper and lower dies 2, 3 is preferably set thinner by about 0.1 mm in advance.

(b) Materials

Materials forming the upper and lower dies 2, 3 may be cast iron, cast steel (for instance, JIS SS400, etc.), carbon steel (for instance, JIS S45C-H, etc.), etc. Cast iron having a low linear thermal expansion coefficient is commercially available under the trademark of "NOBINITE" from Enomoto Chukousho Co., Ltd. Materials forming the side dies 4, 5 may be aluminum, etc.

Materials forming the plugs 62, 63 and the pins 65 may be alloyed steel (for instance, JIS SCM435H, etc.). Materials forming the seal 66 may be rubbers having enough heat resistance to withstand the curing temperature, such as fluororubbers such as polytetrafluoroethylene (PTFE), silicone rubbers, etc. Commercially available PTFE seals include GORE-TEX No. 3300 available from Japan Gore-Tex Inc.

(2) Production Steps (a) Lamination of Prepregs

The resin-leak-preventing plugs 62, 63 are inserted into the holes 24 of the upper die 2 and the holes 34, 34' of the lower die 3 in advance. Pluralities of rectangular cloth prepreg sheets notched in a fan shape at four corners are laminated on the upper and lower dies 2, 3. As shown in FIGS. 5A and 5B, the prepreg laminates 1a, 1b on the upper and lower dies 2, 3 respectively have excess margins.

The cloth prepreg sheet is composed of a reinforcing fiber cloth impregnated with a matrix resin. The reinforcing fibers are not particularly restrictive, but may be properly selected from carbon fibers, aramide fibers, glass fibers, boron fibers, etc. depending on applications. The matrix resin is preferably a heat-setting resin, which may be properly selected from epoxy resins, polyurethanes, unsaturated polyesters, bismaleimide resins, phenol resins, etc. depending on applications. When the panel-shaped, fiber-reinforced composite member 1 is used for the aircraft fuselage, the reinforcing fibers are preferably carbon fibers, and the matrix resin is preferably an epoxy resin.

(b) Cutting of Excess Margins

Figure 5F:
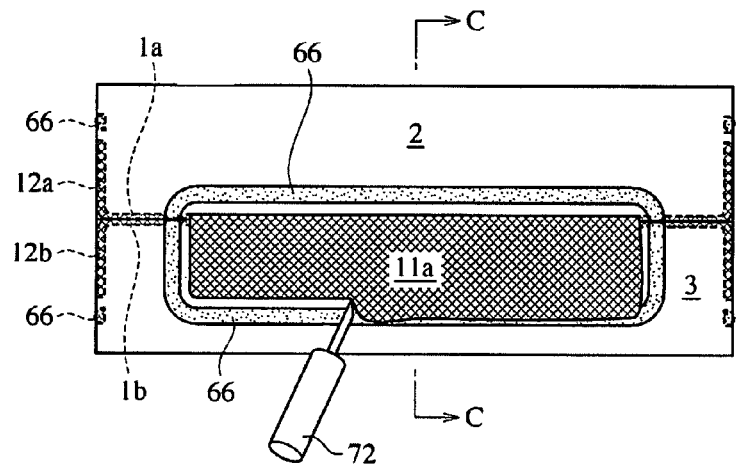
FIG. 5F is a side view showing the cutting of a transverse excess margin of a prepreg laminate placed on the upper die, which drapes on a prepreg laminate placed on the lower die.
Figure 5G:
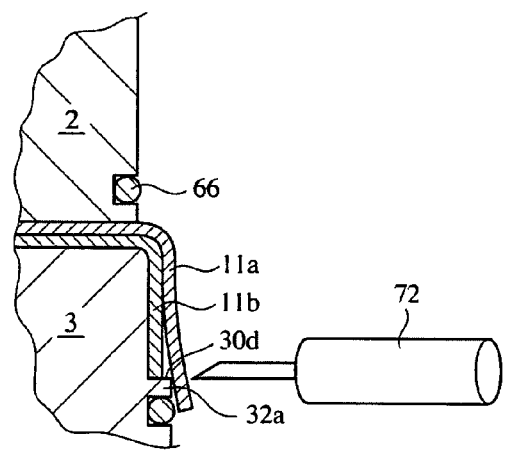
FIG. 5G is a partial cross-sectional view taken along the line C-C in FIG. 5F.

As shown in FIGS. 5C and 5D, using a trimming tool 72 such as a cutter, etc., the excess margin 12a of the prepreg laminate 1a is cut off or trimmed along the end surface 20c of the cavity 20 of the upper die 2, and the excess margins 11b, 12b of the prepreg laminate 1b are cut off along the end surface 30d of the cavity 30 of the lower die 3. Seals 66 are fit into the grooves 21a, 21b of the upper die 2 and the grooves 31a, 31b of the lower die 3. Silicone sheets are inserted into the groove 26 of the upper die 2 and the groove 36 of the lower die 3. With the pins 65 inserted into the holes 37 of the lower die 3 and their heads 65a received in the holes 25 of the upper die 2, the upper die 2 is combined with the lower die 3 such that the prepreg laminates 1a, 1b come into contact with each other, as shown in FIG. 5F. In a state where the prepreg laminate 1a placed on the upper die 2 is draped on the prepreg laminate 1b placed on the lower die 3, the longitudinal excess margin 11a of the prepreg laminate 1a is cut off along the end surface 30d of the cavity 30 of the lower die 3, as shown in FIGS. 5F and 5G The trimming is usually conducted at room temperature.

Because excess margins are cut off from the easily trimmable uncured prepreg laminates 1a, 1b, the method of the present invention can easily produce fiber-reinforced composite members with better cut surfaces than conventional methods of trimming cured prepreg moldings.

(c) Lamination of Prepregs for Flanges

Figure 5H:
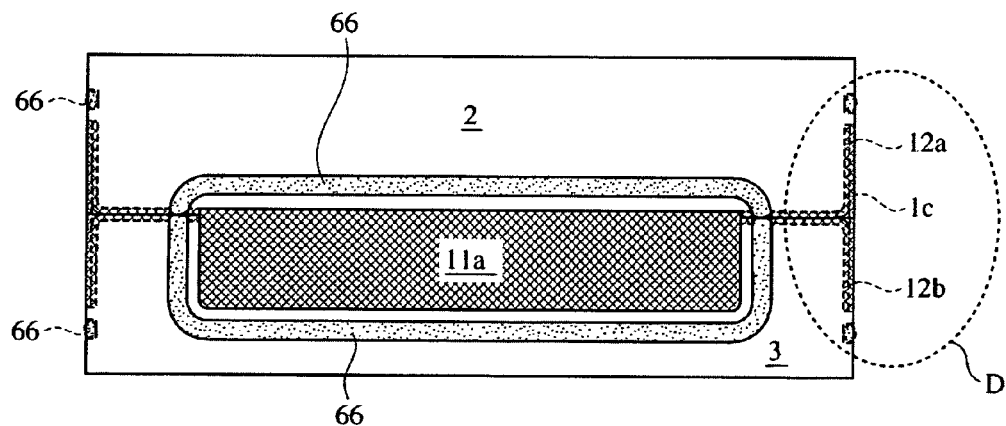
FIG. 5H is a side view showing a prepreg strip laminated on flanges of the prepreg laminates sandwiched by the upper and lower dies.
Figure 5I:
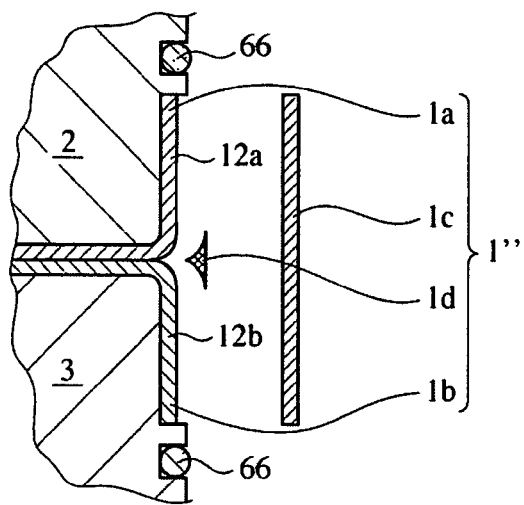

As shown in FIGS. 5H and 5J, a prepreg strip 1c is laminated on the flanges 12a, 12b of the prepreg laminates 1a, 1b via a filler 1d made of reinforcing fibers and a matrix resin, to strengthen the flanges 12, 12. Thus obtained is a prepreg assembly 1" integrally comprising the prepreg laminates 1a, 1b, the prepreg strip 1c, and the filler 1d.

(d) Curing Step

Figure 6:
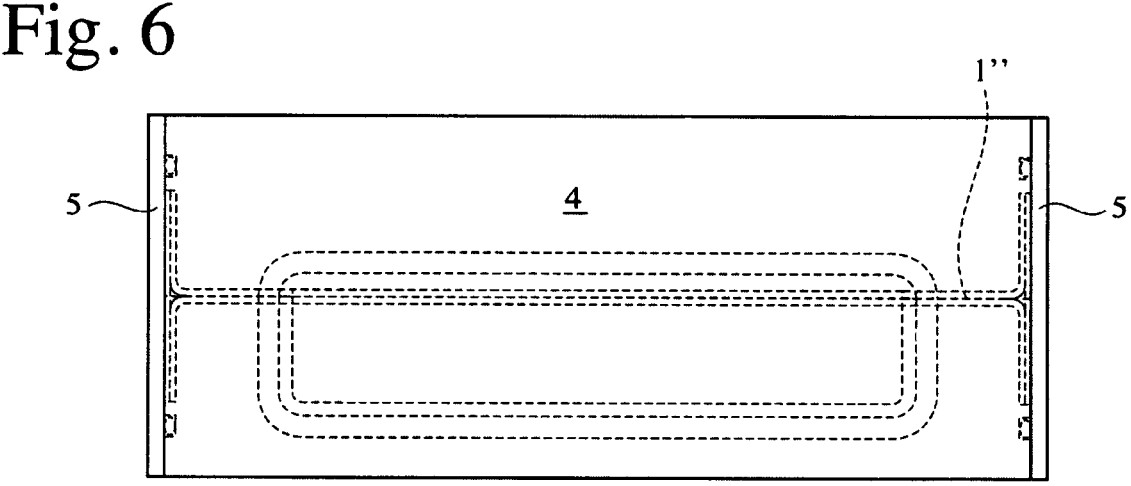
FIG. 6 is a side view showing side dies assembled to the closed upper and lower dies of FIG. 5J.
Figure 7:
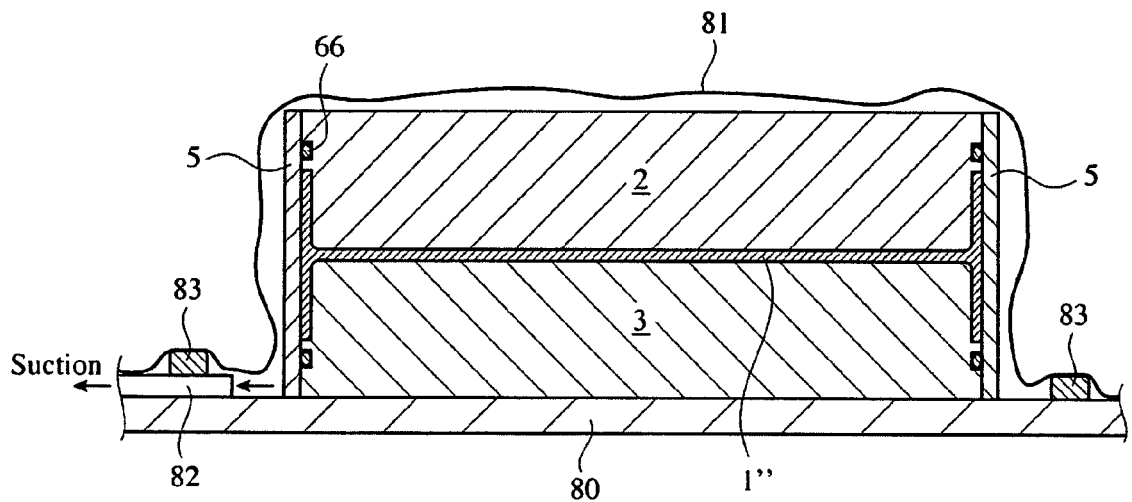
FIG. 7 is a cross-sectional view showing a prepreg molding and a molding die both covered with a bag film and evacuated.

As shown in FIG. 6, side dies 4, 4, 5, 5 are clamped to side surfaces of the combined upper and lower dies 2, 3, to support the flanges of the prepreg assembly 1". The overall die is placed on a base plate 80 and covered with a bag film 81 as shown in FIG. 7. The bag film 81 is evacuated through a pipe 82 connected to a vacuum pump. To keep a vacuum state, the bag film 81 is adhered to an upper surface of the base plate 80 by an adhesive tape.

Figure 8:
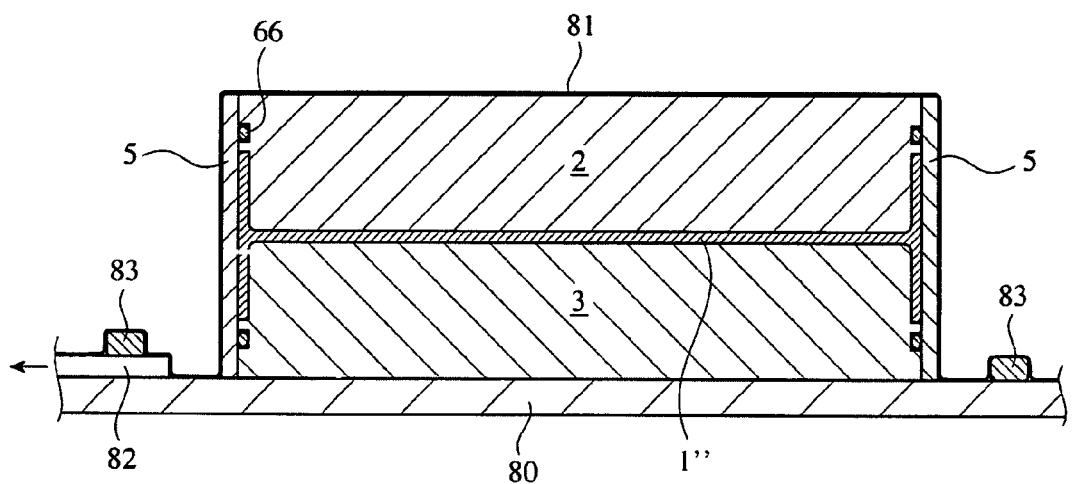
FIG. 8 is a cross-sectional view showing the prepreg molding and the molding die kept in vacuum.

Heating is conducted while keeping the bag film 81 in a vacuum state (see FIG. 8), to cure the matrix resin. Heating may be conducted in an oven, etc., but it is preferably conducted while pressurizing in an autoclave, etc. The heating temperature is preferably 120-180° C., though slightly different depending on the type of the heat-setting resin. When an autoclave is used, pressurization is preferably conducted at about 3-6 MPa.

(e) Boring

Figure 9:
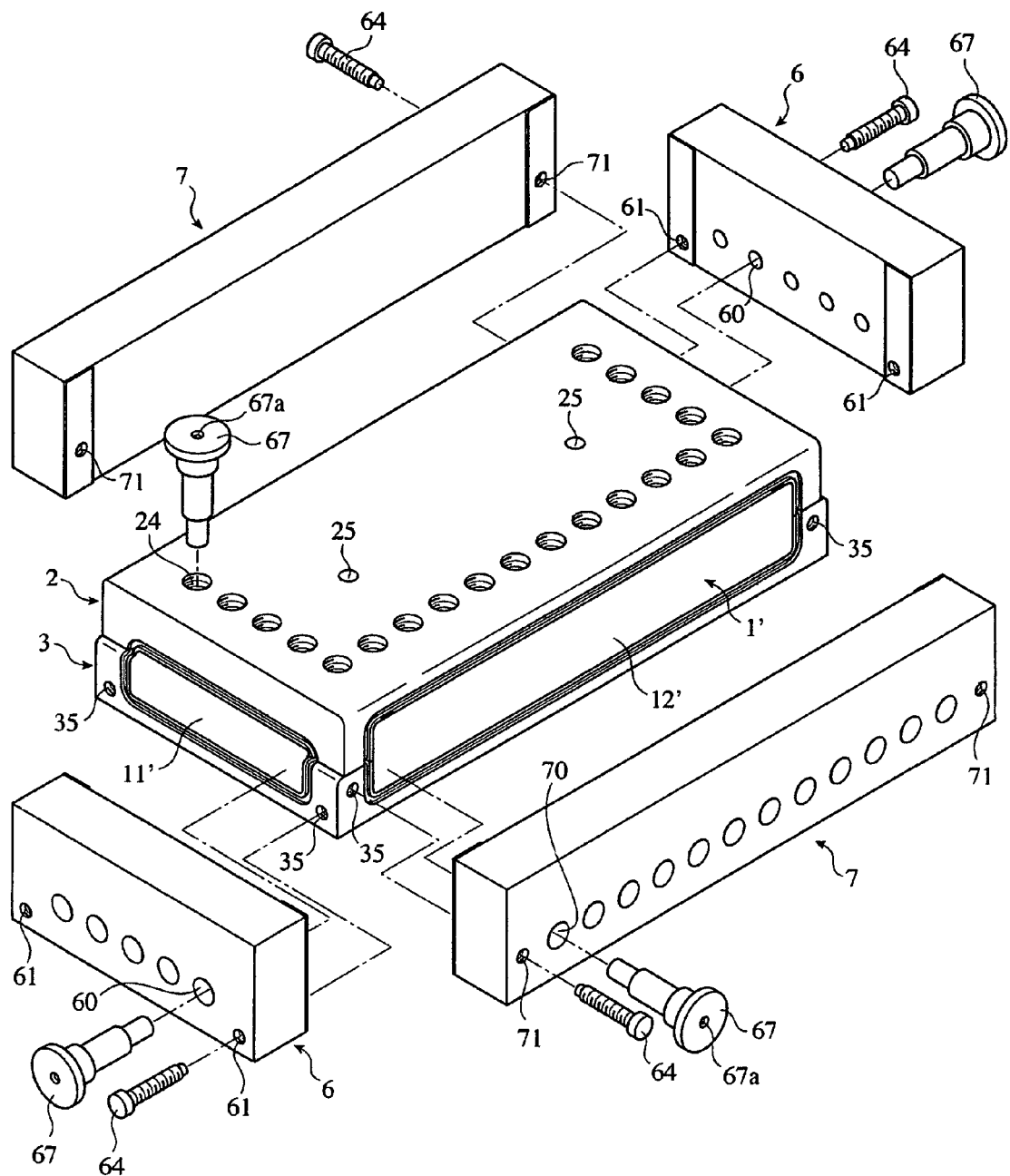
FIG. 9 is an exploded perspective view showing one example of jigs used for boring the cured prepreg molding.

After cooled to room temperature, the side dies 4, 4, 5, 5 are detached. As shown in FIG. 9, boring planar jigs 6, 6, 7, 7 are fixed to the lower die 3, with shouldered bolts 64 screwed into the holes 35 through the holes 61, 71 of the boring planar jigs 6, 6, 7, 7. Each boring jig 6, 7 has holes 60, 70, into which a boring tool is inserted to form holes 15 in the fiber-reinforced composite member 1 in the die. The boring jigs 6, 7 may be made of aluminum, etc. The shouldered bolts 64 may be made of alloyed steel such as JIS SCM435H, etc.

Figure 10:
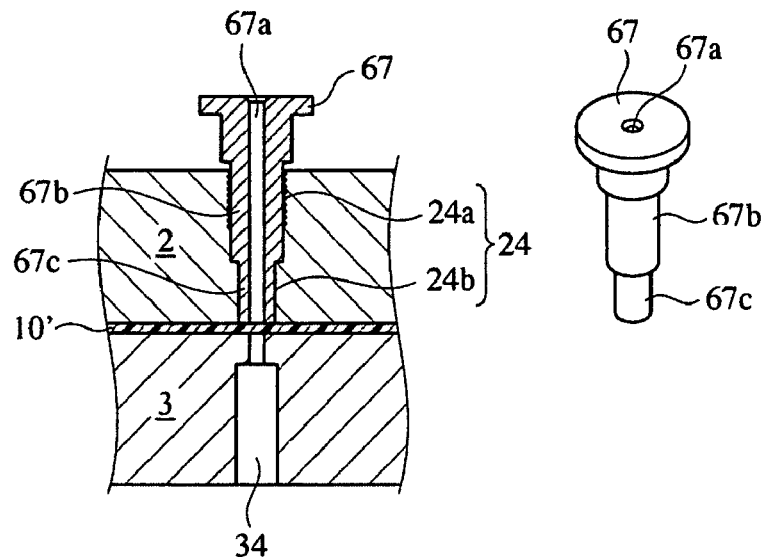
FIG. 10 is a partial cross-sectional view showing a guide plug inserted into each hole of the upper die.

The resin-leak-preventing plugs 62, 63 are detached from the holes 24, 34, 34' of the dies 2, 3. As shown in FIG. 9, tubular guide plugs 67 each having a hole 67a are inserted into the holes 24, 60, 70 of the upper die 2 and the boring jigs 6, 7. As shown in FIG. 10, each guide plug 67 comprises a large-diameter portion 67b fit into the large-diameter portion 24a of the hole 24, and a small-diameter portion 67c fit into the small-diameter hole portion 24b of the hole 24. Because the holes 60, 70 of the jigs 6, 7 have the same shape as that of the holes 24 except for having no threaded portions, they are engageable with the guide plugs 67.

Figure 11:
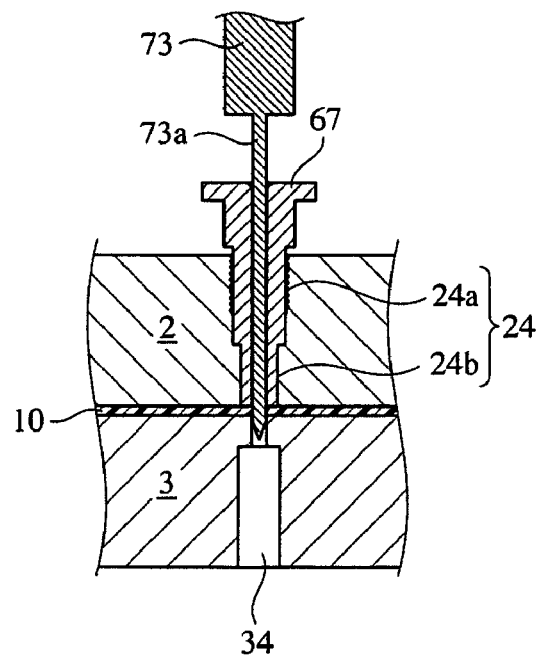
FIG. 11 is a partial cross-sectional view showing the boring of the cured prepreg molding.

As shown in FIG. 11, a boring tool 73 such as an NC drill, etc. is inserted into each hole 67a of the guide plug 67, to bore a cured prepreg molding 1' obtained by curing the prepreg assembly 1". To improve the accuracy of holes 15 in the fiber-reinforced composite member 1 obtained by boring, the hole 67a of the guide plug 67 preferably has a diameter more than the diameter D of the boring tool 73 and D+50 µm or less. With the guide plugs 67 fit into the holes 24, 60, 70, the cured prepreg molding 1' is vertically bored. Because the cured prepreg molding 1' held in the dies 2, 3 are bored using the boring jigs 6, 7 having holes 24, 34, 34', 60, 70, the connecting holes 15 can be formed accurately and efficiently.

(f) Removal from Die

Figure 12:
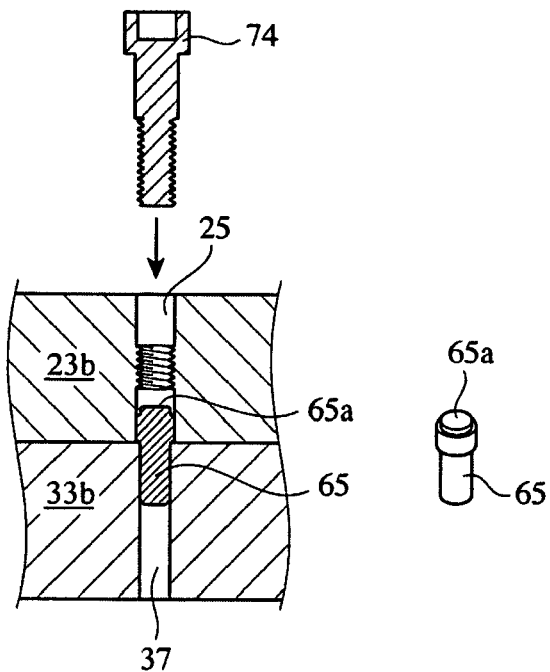
FIG. 12 is a partial cross-sectional view showing a bolt screwed into a hole of the upper die to separate the upper die from the lower die.
Figure 13:
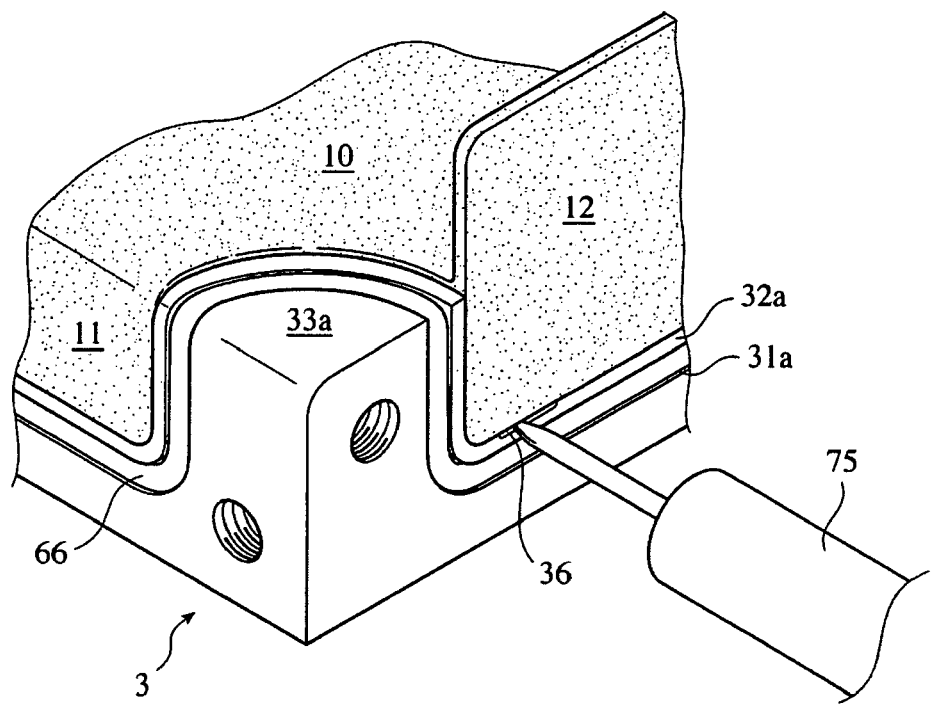
FIG. 13 is a perspective view showing a flat-tip tool inserted into a groove provided in a flange of the lower die to separate the fiber-reinforced composite member from the lower die.

The dies 2, 3 and the boring jigs 6, 7 are detached from the resultant fiber-reinforced composite member 1. As shown in FIG. 12, each hole 25 of the upper die 2 has a threaded portion. A bolt 74 is screwed into the threaded hole 25 to push the head 65a of the pin 65 with its tip end, thereby easily separating the upper die 2 from the lower die 3. A flat-tip tool 75 such as a minus driver is inserted into the groove 26 provided on the flange 22a of the upper die 2 to pry the fiber-reinforced composite member 1 out of the upper die 2. As shown in FIG. 13, a flat-tip tool 75 is also inserted into the groove 36 provided on the flange 32a of the lower die 3 to pry the fiber-reinforced composite member 1 out of the lower die 3.

(3) Other Embodiments

Figure 14:
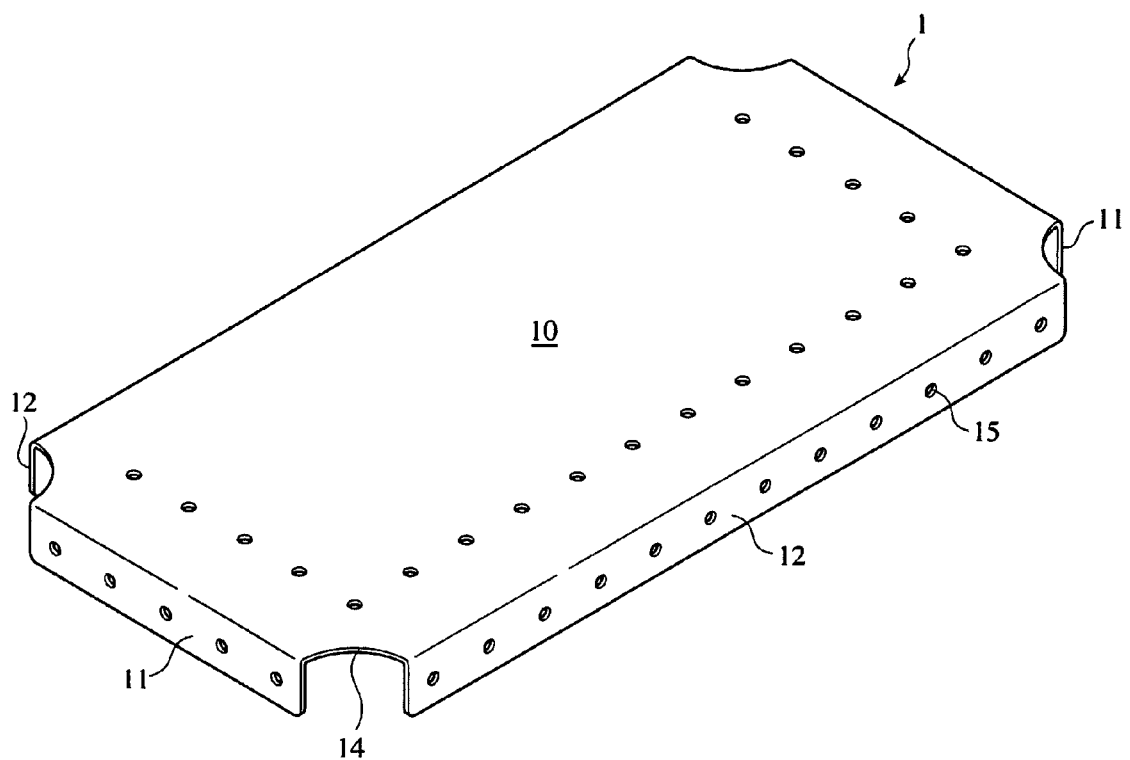
FIG. 14 is a perspective view showing another example of fiber-reinforced composite members produced by the method of the present invention.
Figure 15:
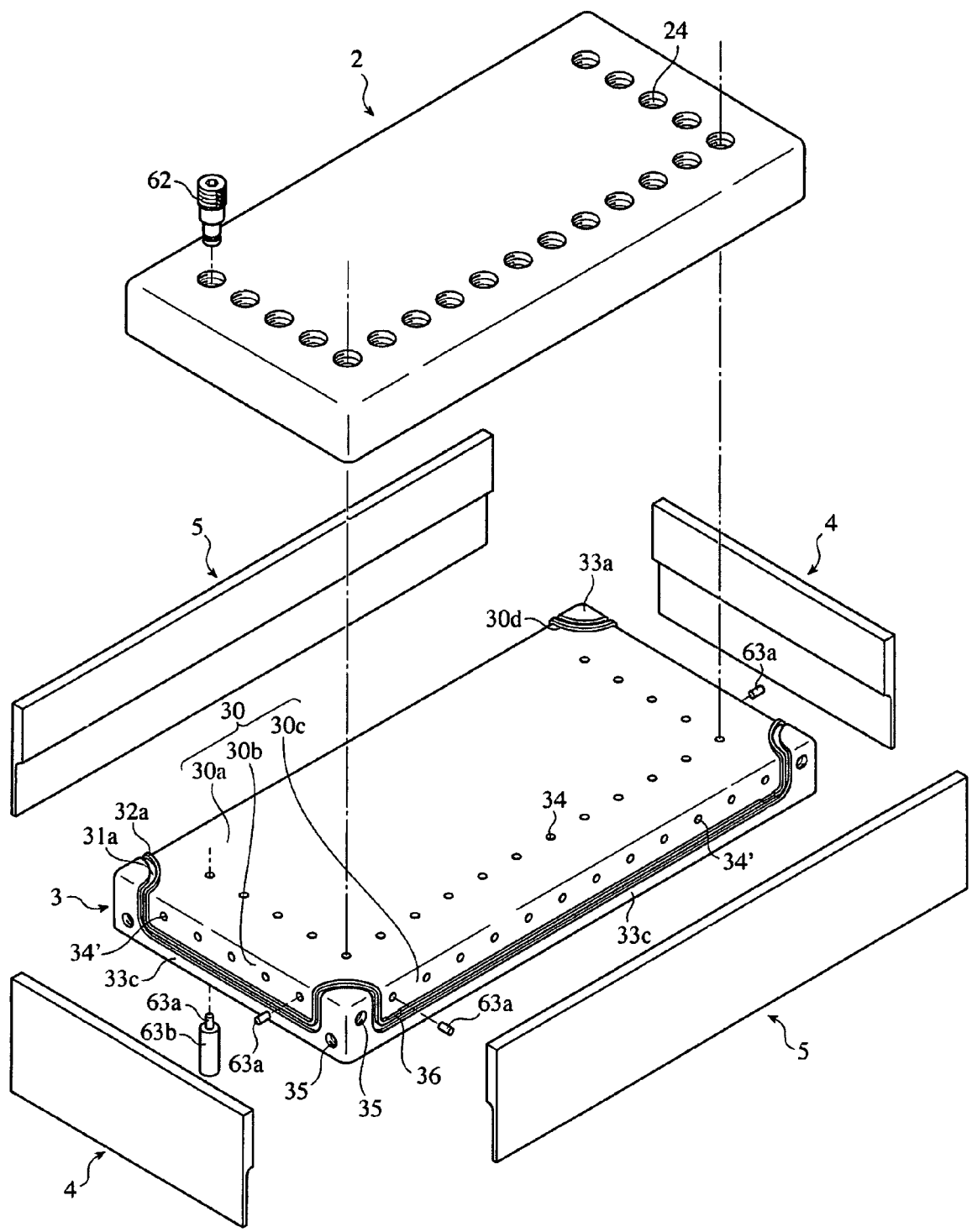
FIG. 15 is a perspective view showing one example of dies for molding the fiber-reinforced composite member of FIG. 14.

FIG. 14 shows another example of the fiber-reinforced composite members produced by the method of the present invention. This panel-shaped, fiber-reinforced composite member 1 is the same as the fiber-reinforced composite member 1 shown in FIG. 1, except for having flanges 12, 12 projecting from both longitudinal side edges on one side, without circular holes 13, 13. FIG. 15 shows one example of dies for forming the fiber-reinforced composite member 1 shown in FIG. 14. This molding die is the same as the molding die shown in FIGS. 2-4, except for comprising an upper die 2 having no cavity and a lower die 3 not having circular projections 33b, etc. The molding method using this die is essentially the same as described above, its explanation will be omitted.

(4) Setting Of Dimension Of Molding Die

To prevent decrease in dimensional accuracy due to thermal expansion during the heat curing, the fiber-reinforced composite member 1 (prepreg assembly 1", cured prepreg molding 1') and the molding die preferably have as close linear thermal expansion coefficients as possible. Specifically, because CFRP used for the fiber-reinforced composite member 1 has a linear thermal expansion coefficient of about $2.6 \times 10^{-6}/°$ C., it is preferable to use NOBINITE CS-5 having a linear thermal expansion coefficient of $2.5 \times 10^{-6}/°$ C. (200° C.), or CN-5 having a linear thermal expansion coefficient of $2.7 \times 10^{-6}/°$ C. (200° C.). However, when there is a relatively large difference between their linear thermal expansion coefficients, the dimensions of the cavities of the dies 2, 3 at room temperature are preferably set such that they have the same dimension as that of the cured prepreg molding 1' at a curing temperature.

Figure 16:
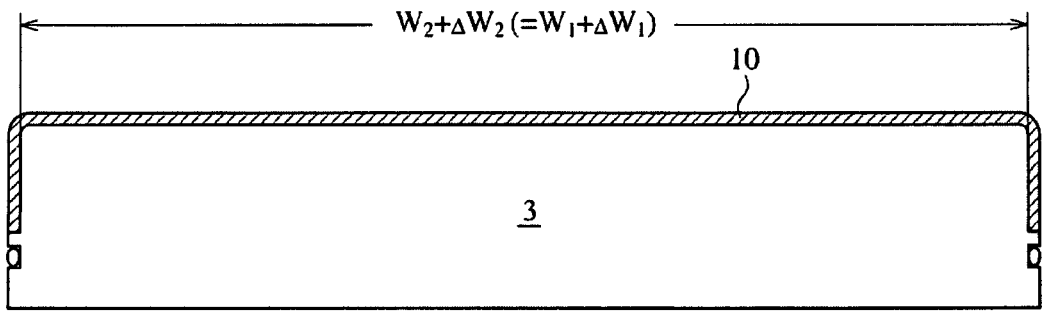
FIG. 16 is a cross-sectional view showing the dimensions of the lower die and the fiber-reinforced composite member at a curing temperature.
Figure 17:
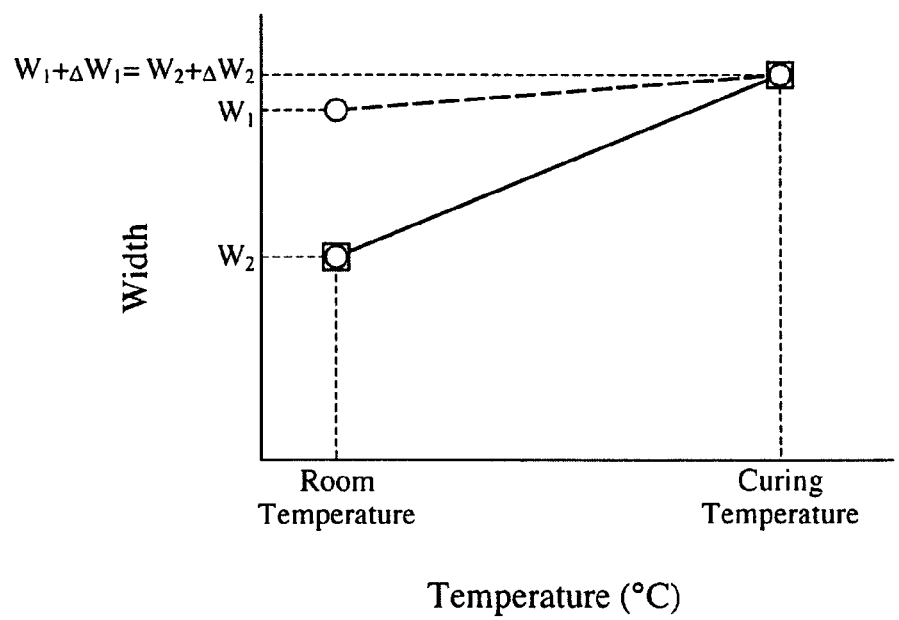
FIG. 17 is a graph showing the dimensional changes of the fiber-reinforced composite member and the molding die caused by temperature change.

Because dimensional accuracy is important in the flat panel portion 10 in the fiber-reinforced composite member 1, its length is designed as $W_1$, and the length of the cavity for providing such designed length is set as $W_2$. When heated from room temperature to the curing temperature, as shown in FIGS. 16 and 17, the length $W_1$ of the flat panel portion 10 becomes $W_1 + \Delta W_1 (= \alpha_1 \cdot W_1 \cdot \Delta T)$, and the length $W_2$ of the cavity becomes $W_2 + \Delta W_2 (= \alpha_2 \cdot W_2 \cdot \Delta T)$. Here, $\alpha_1$ is the linear thermal expansion coefficient of the fiber-reinforced composite member 1, $\alpha_2$ is the linear thermal expansion coefficient of the lower die 3, and $\Delta T$ is the difference (° C.) between room temperature and the curing temperature. Because the length of the flat panel portion 10 is equal to that of the cavity at the curing temperature, $W_1+\alpha_1 \cdot W_1 \cdot \Delta T = W_2 + \alpha_2 \cdot W_2 \cdot \Delta T$. Accordingly, $W_2$ is expressed by the following formula (1):

$$W_2 = W_1 \times (1+\alpha_1 \cdot \Delta T)/(1+\alpha_2 \cdot \Delta T) \qquad (1).$$

When the fiber-reinforced composite member 1 is taken out of the dies 2, 3, an angle between the flat panel portion 10 and the flange 11 in the fiber-reinforced composite member 1 tends to become slightly smaller. Accordingly, angles between the horizontal portions 20a, 30a and the vertical portions 30a, 30b of the cavities 20, 30 are preferably set larger than those of the final product by the decrement (for instance, about 0.5-1.5°).

[2] Fuselage Structure

Figure 18:
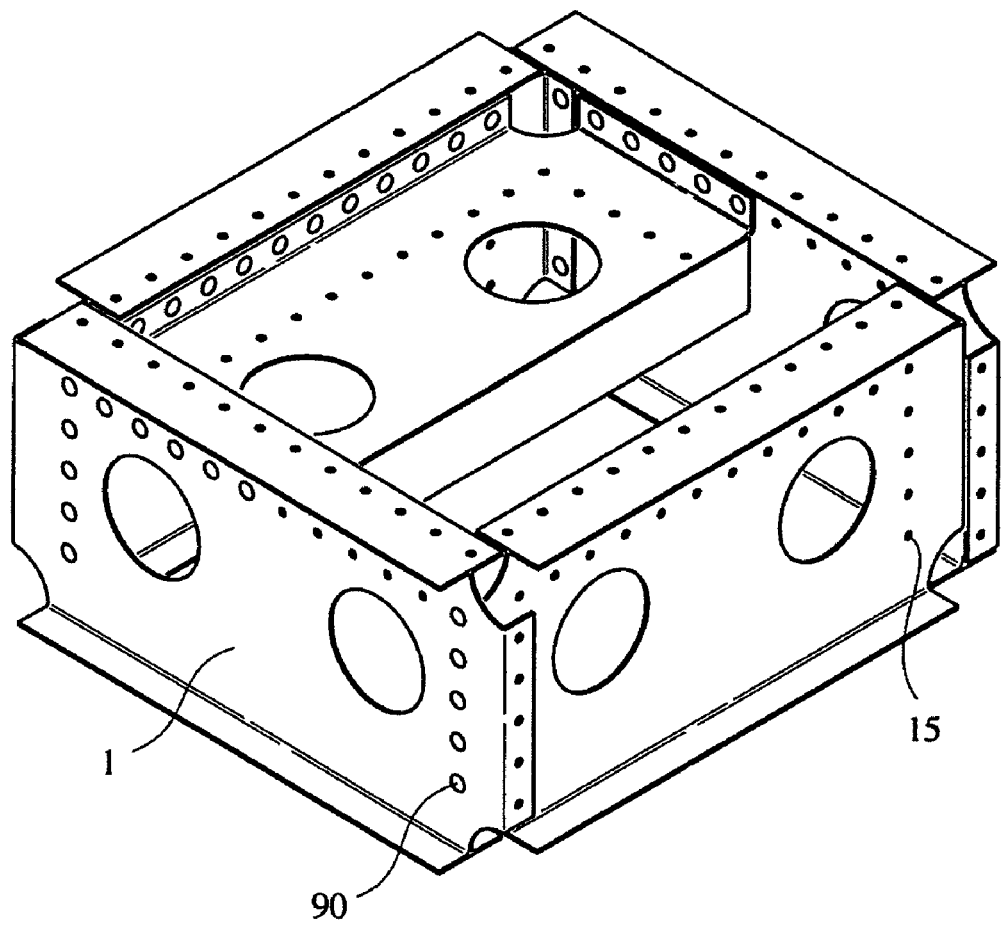
FIG. 18 is a perspective view exemplifying part of an aircraft fuselage structure assembled from the fiber-reinforced composite members.

The fiber-reinforced composite members thus obtained are light in weight and high in strength, suitable as members for constructing the aircraft fuselage structure. FIG. 18 shows an example of the aircraft fuselage structure constituted by the fiber-reinforced composite members produced by the method of the present invention. The fiber-reinforced composite members 1 are connected by rivets 90. The structure shown in FIG. 18 can be used as a floor structure in the aircraft fuselage. Although the fiber-reinforced composite members 1 are connected to each other in this example, they may be connected to other members as aluminum alloy members. Although the fiber-reinforced composite members 1 of the same shape are connected in the example shown in FIG. 18, this is not restrictive, and fiber-reinforced composite members 1 of different shapes may be combined.

Effect Of The Invention

Because excess margins are cut off from the easily trimmable prepregs in the present invention, fiber-reinforced composite members with better cut surfaces can be produced accurately and easily at lower cost than by conventional methods of trimming excess margins from cured prepreg moldings.

What is claimed is:

1. A method for producing a fiber-reinforced composite member having a rectangular, flat panel portion and flanges extending from its edges, from prepregs of reinforcing fibers impregnated with a matrix resin, by using a molding die comprising upper and lower dies each having outer dimensions substantially equal to the other and having a cavity, and a plurality of side dies, each cavity of said upper and lower dies having a horizontal portion having aligned first holes, and vertical portions, at least one of which has second holes, each of the first holes of the upper die having a large diameter screw-threaded portion and a small diameter cylindrical-shaped portion, and each of the first holes of the lower die and the second holes having a large diameter portion and a small diameter portion, comprising:
    (1) forming the molding die by
        fitting resin-leak preventing plugs complementary in shape to each of the first holes of said upper and lower dies and the second holes to the first holes of said upper and lower dies and the second holes, respectively,
        stacking the upper die on the lower die so that each of corner projections of the upper die rests directly on a corresponding corner projection of the lower die so that the horizontal portions of cavities of the upper die and the lower die directly face each other, and
        clamping the side dies, respectively, along each of vertical sides of the stacked upper and lower die so as to cover an entirety of each vertical side of the stacked upper and lower dies including vertical portions of the cavities;
    (2) placing a laminate of said prepregs in the horizontal portions of the cavities of said upper and lower dies and in the vertical portions of the cavities formed between at least one of the side walls and one of the upper and lower dies;
    (3) cutting off excess margins of said prepreg laminate along the edges of the cavities;
    (4) heating said prepreg laminate after closing said upper die, said lower die and said side dies, to cure said matrix resin;
    (5) detaching the resin-leak-preventing plugs from the first holes of the upper and lower dies and the second holes; and
    (6) forming connecting holes in the rectangular, flat panel portion and at least one of the flanges of a resultant cured prepreg molding by fixing a jig having holes aligned with the second holes in said vertical portion to at least one side surface of said upper or lower die, inserting a guide plug having a hole into each of the first holes of said upper die and the holes of the jig, said guide plug being complementary in shape to each of said first holes of said upper die and the jig, and inserting a boring tool into the hole of each guide plug in order to produce the fiber-reinforced composite member.

2. The method for producing a fiber-reinforced composite member according to claim 1, comprising:
    (1) calculating the dimension of said fiber-reinforced composite member at a curing temperature of said prepregs from the designed dimension of said fiber-reinforced composite member at room temperature, using the linear thermal expansion coefficient of said fiber-reinforced composite member, and
    (2) calculating the dimension of the cavity of said molding die at room temperature using the linear thermal expansion coefficient of said molding die, such that it becomes equal to the dimension of said fiber-reinforced composite member at said curing temperature.

3. The method for producing a fiber-reinforced composite member according to claim 1, wherein said fiber-reinforced composite member has a rectangular, flat panel portion and at least one flange extending from its edge, and wherein the horizontal portions of the cavities are provided for supporting said rectangular, flat panel portion and the vertical portion is provided for supporting said flange.

4. The method for producing a fiber-reinforced composite member according to claim 1, wherein a flat-tip tool is inserted into at least one groove provided on an end surface of the vertical portion of the cavity formed between at least one of the side walls and the lower die to pry said fiber-reinforced composite member out of the cavity.

5. The method for producing a fiber-reinforced composite member according to claim 1,
    wherein each of the corner projections of the upper die and the lower die is a fan-shaped projection,
    wherein the method further comprises forming a semicircular notch in at least one corner of the fiber-reinforced composite member between the two fan-shaped projections.

6. The method for producing a fiber-reinforced composite member according to claim 1,
    wherein the cutting off step includes cutting off the excess margins of the prepreg laminate along an end surface of the cavity of the upper die, and cutting off the excess margins of the prepreg laminate along an end surface of the cavity of the lower die.

7. The method for producing a fiber-reinforced composite member according to claim 1, wherein lower surfaces of the corner projections of the upper die are lower most portions of the upper die, and upper surfaces of the corner projections of the lower die are upper most portions of the lower die.

8. A method for producing a fiber-reinforced composite member having a rectangular, flat panel portion and flanges extending from its edges, from prepregs of reinforcing fibers impregnated with a matrix resin, by using a molding die comprising upper lower dies each having outer dimensions substantially equal to the other and having a cavity, and a plurality of side dies, each cavity of said upper and lower dies having a horizontal portion having aligned first holes, and vertical portions, at least one of which has second holes, the horizontal portion of the cavities of the upper die having circular projections each having a threaded pin hole having a threaded portion, and the horizontal portion of the cavities of the lower die having circular projections each having a pin hole, comprising:

(1) forming the molding die by inserting pins having a head having a larger diameter than that of the pin hole into the pin holes of the lower die, stacking the upper die on the lower die with the heads of the pins received in the threaded pin holes of the upper die so that each of corner projections of the upper die rests directly on a corresponding corner projection of the lower die so that the horizontal portions of cavities of the upper die and the lower die directly face each other, and clamping the side dies, respectively, along each of vertical sides of the stacked upper and lower die so as to cover an entirety of each vertical side of the stacked upper and lower dies including vertical portions of the cavities;

(2) placing a laminate of said prepregs in the horizontal portions of the cavities of said upper and lower dies and in the vertical portions of the cavities formed between at least one of the side walls and one of the upper and lower dies;

(3) cutting off excess margins of said prepreg laminate along the edges of the cavities;

(4) heating said prepreg laminate after closing said upper die, said lower die and said side dies, to cure said matrix resin;

(5) forming connecting holes in the rectangular, flat panel portion of a resultant cured prepreg molding by a boring tool inserted into said first holes, while said cured prepreg molding is held in said cavity;

(6) fixing a jig having holes aligned with the second holes in said vertical portion to at least one side surface of said upper or lower die, to form connecting holes in at least one of the flanges of said cured prepreg molding by the boring tool inserted into said holes; and (7) separating the upper die from the lower die by screwing a bolt into each of the threaded holes to push the head of the pin with its tip end.

* * * * *